United States Patent
Huff et al.

(10) Patent No.: US 8,027,092 B1
(45) Date of Patent: Sep. 27, 2011

(54) CURVED LIGHT SHELF SYSTEM FOR DAYLIGHTING AN INTERIOR SPACE

(76) Inventors: Chadrick James Huff, Arvada, CO (US); James Craig Huff, Westminster, CO (US)

( * ) Notice: Subject to any disclaimer, the term of this patent is extended or adjusted under 35 U.S.C. 154(b) by 0 days.

(21) Appl. No.: 13/011,555

(22) Filed: Jan. 21, 2011

Related U.S. Application Data

(60) Provisional application No. 61/354,910, filed on Jun. 15, 2010.

(51) Int. Cl.
*G02B 27/00* (2006.01)
(52) U.S. Cl. ........ 359/591; 359/595; 359/596; 359/597; 359/598; 359/599
(58) Field of Classification Search ........... 359/591–599
See application file for complete search history.

(56) References Cited

U.S. PATENT DOCUMENTS

| | | |
|---|---|---|
| 0,284,963 A | 9/1883 | Hyatt |
| 1,567,984 A | 12/1925 | Reid |
| 1,747,928 A | 2/1930 | Chesney |
| 4,557,565 A | 12/1985 | Ruck et al. |
| 4,593,976 A | 6/1986 | Eijadi et al. |
| 4,630,892 A | 12/1986 | Howard |
| 4,634,222 A | 1/1987 | Critten |
| 5,285,315 A | 2/1994 | Stiles |
| 5,293,305 A | 3/1994 | Koster |
| 5,802,784 A | 9/1998 | Federmann |
| 6,239,910 B1 | 5/2001 | Digert |
| 6,389,216 B1 | 5/2002 | Bartenbach et al. |
| 6,480,336 B2 | 11/2002 | Digert et al. |
| 6,490,403 B2 | 12/2002 | Bartenbach et al. |
| 6,714,352 B2 | 3/2004 | Rogers et al. |
| 2001/0019451 A1* | 9/2001 | Digert et al. ................. 359/596 |
| 2010/0254011 A1* | 10/2010 | Griffiths ....................... 359/597 |

FOREIGN PATENT DOCUMENTS

| | | |
|---|---|---|
| DE | 3831318 A1 | 3/1990 |
| JP | 58199314 A | 11/1983 |

* cited by examiner

*Primary Examiner* — Clayton E LaBalle
*Assistant Examiner* — Kevin Butler
(74) *Attorney, Agent, or Firm* — Dorr, Carson & Birney, P.C.

(57) ABSTRACT

A light shelf for daylighting an interior space with reflected sunlight has a reflective upper surface having a cyma-reversa profile along a vertical cross-section perpendicular to the window, with a convex region adjacent to the window and a concave region distal from the window.

17 Claims, 5 Drawing Sheets

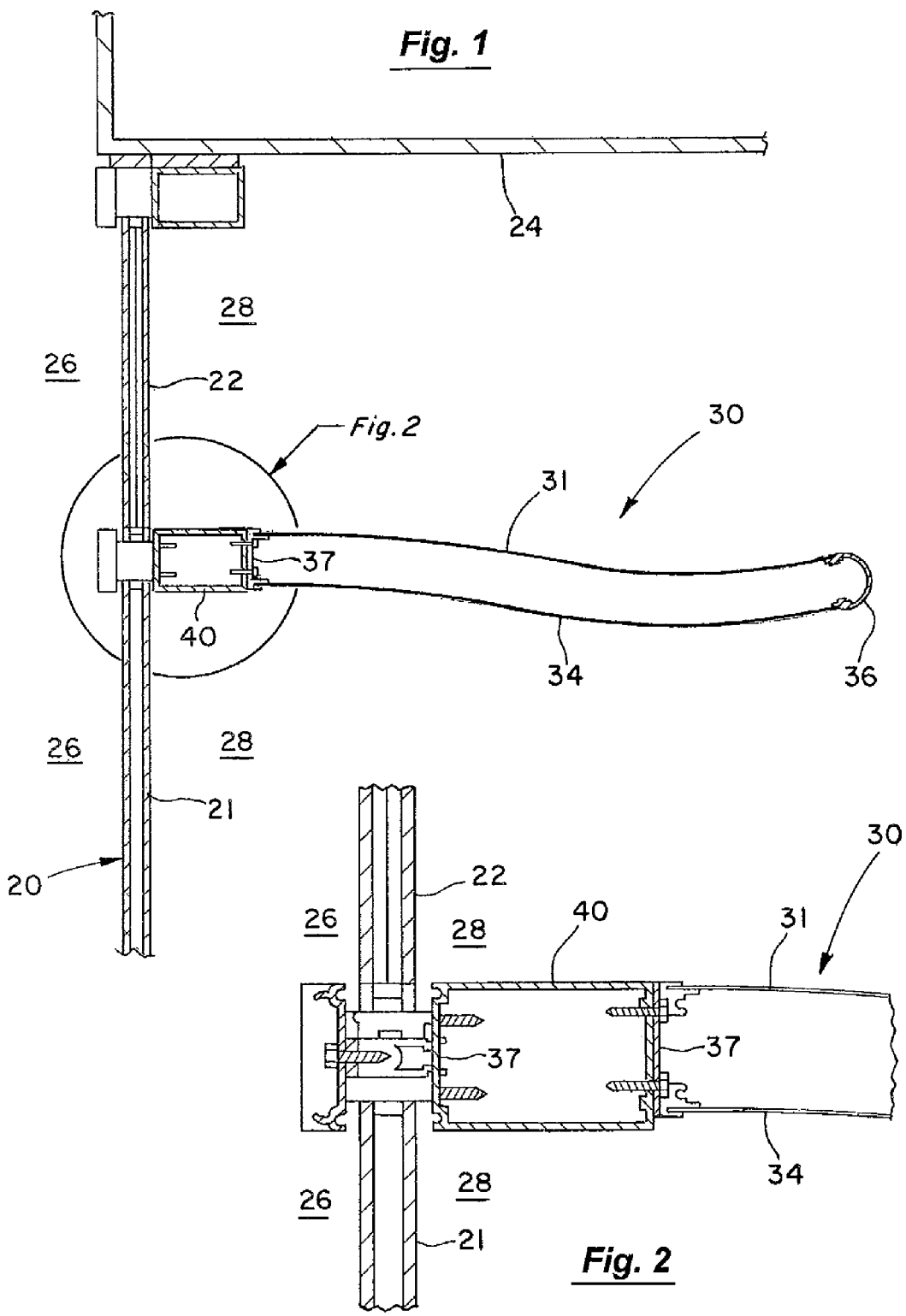

CURVED LIGHT SHELF SYSTEM FOR DAYLIGHTING AN INTERIOR SPACE

RELATED APPLICATION

The present application is based on and claims priority to the Applicants' U.S. Provisional Patent Application 61/354,910, entitled "Curved Light Shelf System For Daylighting An Interior Space," filed on Jun. 15, 2010.

BACKGROUND OF THE INVENTION

1. Field of the Invention

The present invention relates generally to the field of interior space illumination systems. More specifically, the present invention discloses a curved light shelf system mounted adjacent to a window to redirect incident sunlight into an interior space.

2. Statement of the Problem

It is a problem in the field of interior space illumination to provide a cost-effective mode of illumination that makes use of the incident sunlight without the need for complex systems or significant occupant intervention. For the purposes of this application, the term "daylighting" should be broadly construed to include any use of natural light from a clear sky (including daylight from both the solar disk and the sky dome) or overcast sky as an interior illuminant. Existing daylighting systems are either of limited effectiveness, limited applicability due to their architectural limitations, or require complex and expensive mechanical and electronic control mechanisms.

There is a need for systems that provide improved energy efficiency and environmental quality. One need is to reduce the consumption of electricity for lighting. One option for reducing electricity consumption for lighting is to use daylight to illuminate occupied building spaces. The key to the widespread use of daylighting systems is in providing a system that is both inexpensive and easily applied to both new and existing buildings. In addition to the savings attributed to reduced electricity consumption, daylighting systems typically also result in increased productivity by the occupants of the illuminated space, reduced health problems evidenced by the occupants of the illuminated space and pollution reduction. There appears to be a strong correlation between the quality of the luminous environment and the overall health and productivity of the occupants. These ancillary benefits can produce savings that dwarf the savings attributable to electricity consumption reduction, since studies indicate that, over the life of the building, an overwhelming percentage of the operating cost of commercial space is the salaries of the occupants. Thus, any improvement in the performance of the occupants of the building space results in a significant economic benefit.

One such existing daylighting system is the traditional light shelf, which receives daylight through a window and redirects it onto the interior ceiling plane, thereby creating a useful source of interior illumination. The basic light shelf concept typically comprises a wide flat elongated interior light shelf located adjacent to a window that protrudes into a room from the exterior wall of a building. The incident sunlight is reflected by the light shelves onto the ceiling of the occupied space by a diffuse or specular horizontal or slightly-sloped upper surface of the light shelf. However, an interior light shelf typically protrudes a significant distance into the occupied space and is problematic from architectural, mechanical and aesthetic standpoints in many room applications.

FIG. 3 is a side cross-sectional view of a typical prior-art light shelf daylighting system. This daylighting system includes at least one light shelf 30 located in the interior space 28 of a building adjacent to a window 20. Each light shelf 30 is oriented in a substantially horizontal plane with its outer edge adjacent to the window 20. If multiple light shelves are employed, they are typically stacked in a vertical arrangement similar to conventional blinds. Optionally, light shelves can also be located on the exterior 26 of the building adjacent to the window 20.

The basic light shelf concept typically includes a wide flat elongated interior light shelf 30 located adjacent to a window that protrudes into the room from the exterior wall of a building to receive incident sunlight 10, as illustrated in FIGS. 3 and 6. The incident sunlight 10 is reflected by the light shelf 30 onto the ceiling 24 of the interior space 28 by the top surface of the light shelf 30. In the embodiment depicted in FIGS. 3 and 6, the top surface of the light shelf 20 is located a predetermined distance below the ceiling 24, and divides the window 20 into a view area 21 below the light shelf 30, and a daylighting area 22 above the light shelf 30. The view area 21 can be equipped with a conventional shade control to controllably regulate the intensity of the incident daylight that is transmitted to the interior space 28 as well as to enable the occupants of the interior space 28 to control the visibility of the interior space 28 from outside the building. No means is typically provided to block the incident daylight through the daylighting area 22, although a shade element may be provided for blackout purposes, or to block light from low angles of elevation that may otherwise bypass the light shelf and cause unwanted glare.

3. Prior Art

The prior art in the field of light shelves and other devices for reflecting sunlight into an interior space includes the following:

U.S. Pat. No. 284,963 (Hyatt) discloses of a system of flat louver-type blades mounted in an arrangement similar to that of a hinged louvered register. This system is designed to pass natural daylight into an interior room through reflectance from the flat, louvered blades. The system is designed to pivot on a hinge and be operated by a rope-and-pulley system to allow the building occupant to adjust the daylight. One shortcoming associated with this system is that it relies on the operator for continual adjustments. The system also relies on it being placed on a rooftop, more in the fashion of a skylight rather than in a wall system. This renders the invention less useful on multiple-level buildings since only the top floor can be used for daylighting.

U.S. Pat. No. 1,567,984 (Reid) discloses a system having a flat reflector plate with a corrugated surface hinged about the interior of a window system. This invention employs many traits of a traditional light shelf in that a light collection area reflects light toward the ceiling of a room. The shortcoming associated with this system is that it tends to direct light in concentrated areas on the ceiling called "hot spots". The irregular surface that this system utilizes would do little to scatter light deeper into the interior space.

U.S. Pat. No. 1,747,928 (Chesney) discloses a system of curved reflector plates mounted to both the inside and outside of the window. The outermost reflector plates are concave to reflect and concentrate light. The concave members predominately face each other to concentrate and direct the light inward toward a third reflector plate. The third reflector plate is convex and scatters the light toward the floor. One shortcoming is that exterior-mounted reflectors are subject to the elements such as wind, snow, rain, and pollution. When dirt or snow collects on the exterior reflector plates, they become ineffective at collecting the daylight. A second shortcoming is that it requires a substantial vertical distance of window to operate correctly. This inhibits the view portion of most windows, therefore making less of the outdoors visible from the interior of the building, and making occupants feel more closed in than if there were no apparatus installed. A third shortcoming is that of concentrating light. Concentrated light can cause intense heat and with that an increased risk of fire. Finally, the light diffused by the third convex reflector is directed toward the floor and the building occupants, which creates undesirable glare. Intense sun glare can have a negative impact on building occupants.

Japan Patent No. 58-199314 (Tomofuji) discloses a small-sized concave light condensing device. This is opposite of a daylighting device that produces diffuse light. Instead, the Tomofuji device collects and concentrates light into one area.

U.S. Pat. No. 4,630,892 (Howard) discloses a system of three flat surfaces, with two mounted on the exterior, and one mounted on the interior to reflect and direct light inside a building. This can cause hot spots and also requires constant building occupant adjustment for changing sun angles.

U.S. Pat. No. 4,634,222 (Critten) discloses a natural-light illumination enhancement assembly having a series of louvered reflectors that direct incoming light downward onto the floor for illumination. Here again, this creates glare downward on building occupants.

German Patent No. 3831318 (Hesse) depicts a system of flat prismatic-shaped surfaces that direct light into a space from the exterior side of a building. This is an encased system that is placed in the ground to direct light into basements. Debris, snow, or dirt can gather on the intake side of the system since it is exposed to the elements, and inhibit the effectiveness of the system. The system also would direct light in hot spots.

German Patent No. 020296 (Jurastrasse) depicts of a system of a plurality of concave elements similar to a Venetian blind. The shortcomings associated with this system include keeping the surface behind the device clean. Also this system uses a substantial amount of vertical space thereby allowing more heat gain inside the building. Also this system blocks the view of the occupants to the out-of-doors.

U.S. Pat. No. 5,293,305 (Koster) discloses a system of vertical concave elements within a window system to direct light upward toward the ceiling. This system appears to be relatively complicated to implement and would offer an obscured view through the window. This system also uses a substantial amount of vertical space to implement.

U.S. Pat. No. 5,802,784 (Federmann) discloses a system of vertical concave elements within a window system to direct light upward toward the ceiling. This system appears to be relatively complicated to implement and would offer an obscured view thru the window. This system also uses a substantial amount of vertical space to implement.

U.S. Pat. No. 5,285,315 (Stiles) discloses a system that uses light-reflective elements sandwiched between two panes of glass to redirect sunlight into the interior space of a building. The reflective elements comprise both stationary and movable elements that function to redirect the incident sunlight to the back walls of the room, above eye level without striking the ceiling. A shortcoming associated with this light reflecting system is that it is complicated to implement and produces illumination of variable quality. The existing glazing must also be replaced to implement this system.

U.S. Pat. No. 4,557,565 (Ruck et al.) discloses a system of refractive structures that are used to collect and redirect light into a building. The refractive structures comprise a planar solid transparent light deflecting panel or plate that is formed of a plurality of parallel triangular ribs located on one face. With the panel in its vertical orientation and placed over a window opening, the panel reflects sunlight into the building interior. The panels are designed to require seasonal adjustments to compensate for the seasonal variations in the angle and nature of the incident sunlight. The refractive panels are complicated to implement and require periodic adjustment by the occupant to compensate for changes in the incident sunlight.

U.S. Pat. No. 5,293,305 (Koster) discloses a light guidance system that illuminates the interior of a building by using a light deflection device equipped with a light source. The light guidance system is mounted in a window and both reflects sunlight coming from outside of the building as well as electric light coming from the light source. The light guidance system comprises several light reflective elements that are disposed parallel to one another and spaced apart from one another such that light from outside the building is reflected by the top surface of the light reflective elements and light from an internal light source is reflected by the bottom surface of the light reflective elements into the room. The light reflective elements function both to shade the interior from direct sunlight while also redirecting both the incident sunlight and the light from the light source into the room to provide indirect lighting. A problem with this light guidance system is that it relies on the close spatial-optical relationship between the electric lighting located at the window and the incident sunlight through the window. Another problem with this light guidance system is that it blocks the view through the window and relies on the placement of a source of electric light at the window. Thus, it is expensive to implement and requires expensive adaptation of existing installations to accommodate the light source.

U.S. Pat. No. 4,883,340 (Dominguez) discloses a solar lighting apparatus that is mounted on the roof of a building to provide illumination of the interior of the building. The solar lighting apparatus comprises a reflector assembly that is rotatable about a vertical axis for tracking the daily movements of the sun. The reflector panel has multiple panels that are mounted on a frame over a skylight opening and the frame is rotated by the operation of solar tracking electronics. However, the solar lighting apparatus is effective only for the room area located on the top floor of a multiple story building. In addition, it relies on electronics and mechanical tracking apparatus to collect and redirect the incident sunlight.

U.S. Pat. No. 6,239,910 (Digert) discloses a mini-blind system similar to that of a window treatment or blind. This system is unique due primarily to the curved nature of the individual blades. This type of optical device, while more efficiently scattering the light than a traditional flat light shelves, creates problems similar to that of traditional window treatments such as the need to continually clean the interior surface of the window directly behind the apparatus. Maintenance personnel can easily damage this type of system making it impractical in most commercial settings. Once a single blade of this system is bent it can direct light inadvertently into buildings occupants' path of vision, creating discomfort. Also, this type of system is mounted vertically. This requires significant square footage of window surface area to allow ample sunlight to penetrate. It is known that letting natural daylight penetrate the building has the inherent drawback of solar heat gain that can increase the buildings cooling system loads substantially in summer months. Often the increased costs of operating such cooling systems can outweigh the benefit gained in electricity savings of interior daylight illumination.

U.S. Pat. No. 6,389,216 and U.S. Pat. No. 6,490,403 (Bartenbach et al.) disclose a system having a rolled sheet that is toothed with flat surfaces to guide the light in a particular direction. This system is meant to be installed in conjunction with a daylighting device such as a light shelf to redirect daylight that already has been cast to the ceiling.

U.S. Pat. No. 6,480,336 (Digert et al.) discloses a system of concave-curved slats that are vertically stacked, similar to Venetian blinds or that shown in U.S. Pat. No. 6,239,910. Due to its nature, the shortcomings are very similar in those of both devices. One other shortcoming is that this is a static device that cannot be easily removed to access the surface directly behind it for regular cleaning.

U.S. Pat. No. 6,580,559 (Doll et al.) discloses a system having a vertically-arranged plurality of flat members placed within a window system for directing light. This system has shortcomings similar to that of U.S. Pat. Nos. 6,239,910 and 6,480,336, being as it is predominately vertical and uses a large amount of viewable window space to implement.

U.S. Pat. No. 6,714,352 (Rogers et al.) discloses a system having a vertically-arranged plurality of concave-shaped sections with flat bottom surfaces. This system has shortcoming similar to those of U.S. Pat. Nos. 6,239,910, 6,480,336, and 6,580,559 since it is arranged in a similar vertical fashion.

Thus, the field of interior space illumination systems appears to be devoid of an inexpensive, practical, effective, and simple-to-use daylighting system that can be easily implemented in both existing building applications as well as in new building construction. The problem with most existing systems is that they either take up too much vertical window space that could be otherwise used for view, they are difficult to maintain, require frequent occupant intervention, or cast light in concentrated patterns creating hot spots.

Architectural Moldings. The prior art in the fields of moldings, architectural trim and picture frames includes a family of decorative cross-sectional profiles commonly referred to as cyma-reversa curves. This profile is also sometimes referred to as an ogee curve. For the purposes of this disclosure, these terms are used synonymously. A cyma-reversa profile has a region with a convex surface followed by a region with a concave surface. In other words, an initial region a cyma-reversa curve bulges outward and is followed by a second region that bows inward. These regions can flow together in a smooth, continuous manner, somewhat similar to a relaxed S-shape. Alternatively, these regions can be clearly demarcated and separated from one another. Although cyma-reversa curves have been employed in moldings, picture frames and architectural details for their aesthetic appeal, they are not believed to have been applied to the field of reflectors or light shelves in particular.

Solution to the Problem. The above-described problems are solved and a technical advance achieved in the field by the present curved light shelf daylighting system having a cyma-reversa profile. In particular, the present curved light shelf is a passive, static optical device that can be mounted horizontally adjacent to a window of a building. The curved light shelf receives daylight transmitted through the window and efficiently redirects it onto the ceiling of an interior space in a diffuse manner, double washing the ceiling with a relatively even amount of illumination, thereby creating a useful source of interior illumination that is free of hot spots and is cast deeper into the room than the conventional light shelves.

The curved light shelf comprises a single predominately horizontal shelf, that is optically shaped via a cyma-reversa top surface to allow light to be efficiently collected and accurately directed onto the ceiling plane of a room, while at the same time shading the occupants of the room from direct sunlight penetration through the shelf. The curved light shelf is narrow and can be implemented in the normally unused upper foot, or so, of most interior spaces.

The window area may or may not be partitioned by the light shelf into a view section and a daylighting area. The occupants' views out of the building remain relatively unobstructed through the view area of the glazing to a height of approximately seven feet, or greater, above the floor. Traditional window treatments, such as exterior shading devices, or interior blinds can be used for this portion of the glazing for shading, privacy, and blackout control. The sunlight incident on the daylighting area of the glazing is collected by the curved light shelf and redirected onto the ceiling plane of the room in a glare-free manner.

The curved light shelf system produces effective daylighting for typical ambient light levels for the perimeter zones of a building, and can operate for room depths in excess of fifty feet. The optical geometry of the light shelf and the associated reflective surface characteristics diffuse the collected sunlight more evenly over a larger area of the ceiling plane of the room. The resultant indirect lighting is striation free and substantially uniform in luminance. The use of daylight preserves the visual and psychological connection between the occupants and the outdoors due to the subtle color and luminance changes which occur throughout the day. Visual comfort is enhanced by evenly diffusing the daylight across the ceiling plane of the room from the perimeter wall to the interior extent of the illumination.

SUMMARY OF THE INVENTION

This invention provides a light shelf having a curved upper surface with a cyma-reversa profile. The convex section of the cyma-reversa curve adjacent to the window disperses light across a large area of the interior ceiling, while the concave section of the cyma-reversa curve reflects light to double wash the ceiling closer to the light shelf and create a more uniform pattern of illumination.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 1 illustrates an embodiment of the present curved light shelf daylighting system in cross-sectional view.

FIG. 2 is a detail cross-sectional view of the mounting bracket 40 for the light shelf 30.

DETAILED DESCRIPTION OF THE INVENTION

Figure 4:
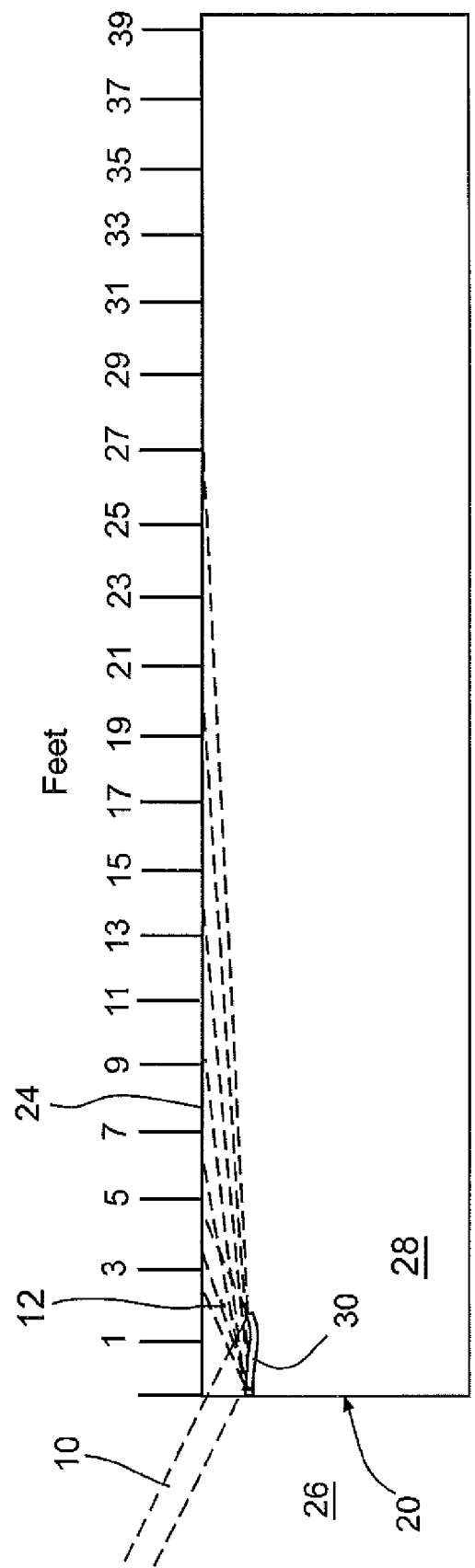
FIG. 4 illustrates a side cross-section view of a typical interior space in which an cyma-reversa curved light shelf daylighting system installed.
Figure 5:
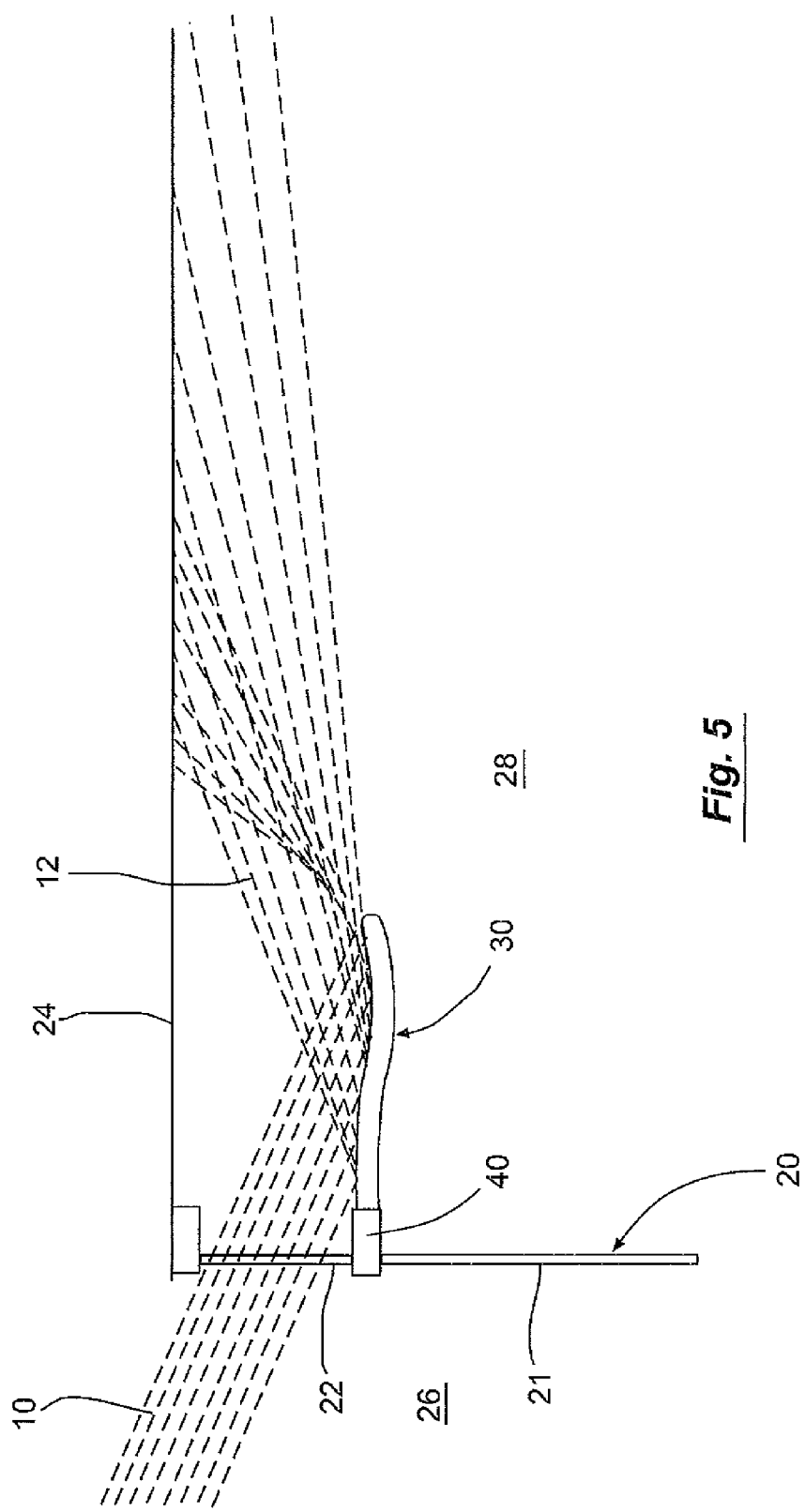
FIG. 5 is a side cross-sectional view illustrating the light deflection pattern from a cyma-reversa curved light shelf, and in particular, showing how the convex portion of the curve throws the light far at very slight angles, and the concave portion of the curve redirects and double washes the ceiling closer to the light shelf.
Figure 6:
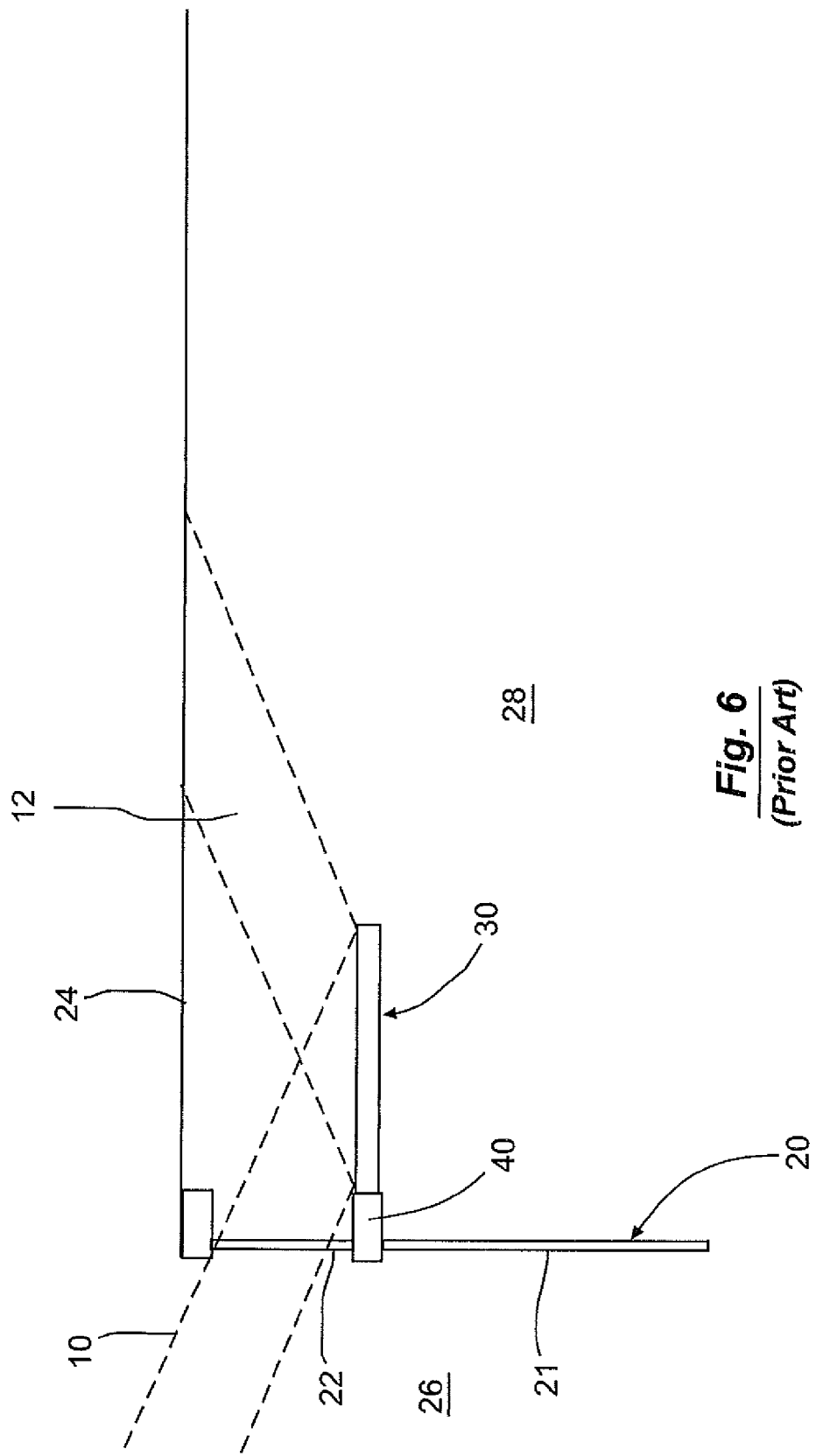
FIG. 6 is a side cross-sectional view illustrating the light deflection pattern off of a conventional flat light shelf, which results in light being reflected in a concentrated pattern on the ceiling.

FIG. 1 illustrates a side cross-sectional view of one embodiment of the present curved light shelf daylighting system. The curved light shelf daylighting system extends horizontally and is positioned adjacent to the window glazing 20 at an elevation above the normal occupant viewing height. Thus, the typical installation of the curved light shelf daylighting system can be positioned at an elevation ranging anywhere from about seven feet above the floor upward to the top of the window glazing 20. The window glazing 20 can be viewed as being partitioned into a view area 21 and a daylighting area 22 by the light shelf 30. It should be noted that it is not necessary to have a horizontal mullion 40 present to divide the daylighting area 22 and the view area 21, as this may be accomplished by the presence of the light shelf 30 itself. The occupant's views out of the building are largely unobstructed by the light shelf 30, since the light shelf 30 is typically located above the normal occupant viewing height. The light shelf 30 receives the unobstructed incident daylight 10 that passes through the daylighting section 22 of the window 20, collects this incident daylight 10 and redirects it onto the ceiling surface 24 in a substantially glare-free manner as shown in FIGS. 4 and 5.

Returning to FIG. 1, the upper surface of the light shelf 30 has a cyma-reversa cross-sectional shape in a vertical plane perpendicular to the window 20. In particular, the upper surface of the light shelf 30 has a convex region 31 that initially curves slightly downward from the edge adjacent to the window 20. The tail of the light shelf 30 that extends into the interior of the room curves slightly upward to create a slightly concave region 32 distal from the window 20. This cyma-reversa cross-sectional profile can extend in a substantially uniform manner along the entire length of the light shelf 30.

When viewed from above or below, the light shelf 30 can have a narrow rectangular profile in the horizontal plane, with one long edge adjacent to the window 20 and an opposing distal edge extending at a distance in the interior of the room. The length of the light shelf 30 can be selected to correspond to the width of a single window, or to span multiple windows or an entire wall.

The upper surface of the light shelf 30 is reflective. The nature and degree of this reflectivity is a matter of design choice, and can range from a mirror-like (or specular) finish to a finish that diffusely reflects light. A wide range of colors can also be employed.

The convex region 31 of the upper surface of the light shelf 30 diffuses incident light 10 primarily from higher angles in the sky over a large area on the ceiling 24 and so reduces its intensity, as shown in FIG. 4. In contrast, the concave region 32 reflects incident light 10 primarily from lower angles in the sky in a very broad area that at least partially overlaps the ceiling area covered by the convex region 31. As depicted in FIG. 5, the combination of the these reflective regions 31 and 32 double-washes a large area of the ceiling plane 24 with reflected light 12, and thereby creates a larger, more diffuse daylighted area on the ceiling plane 24.

Figure 3:
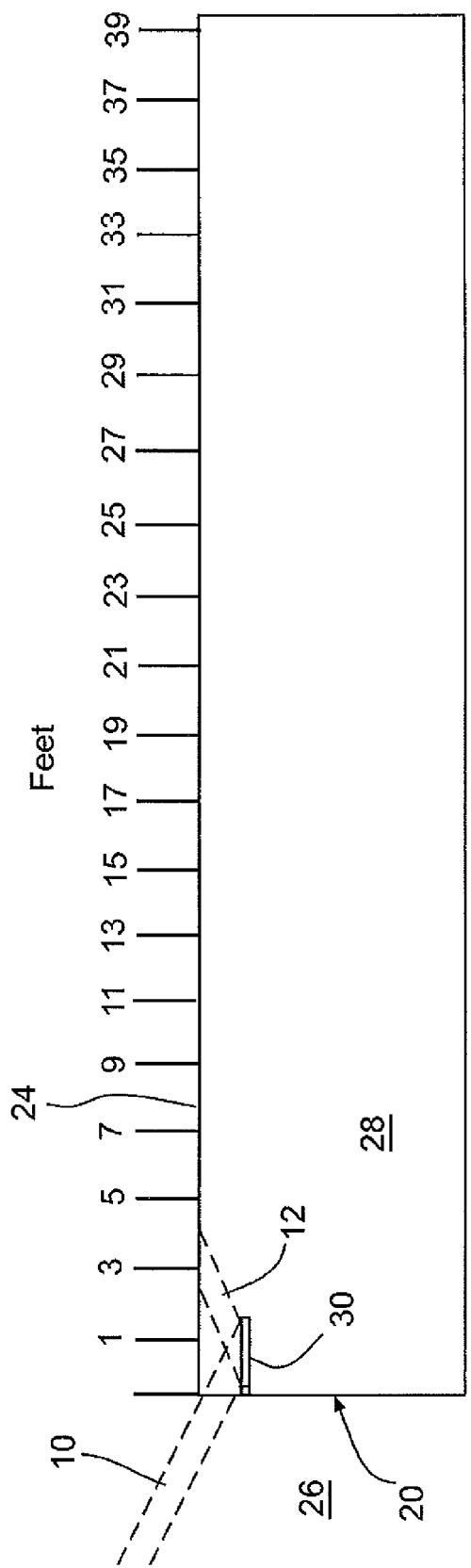
FIG. 3 illustrates a side cross-section view of a typical interior space in which a prior-art flat light shelf daylighting system is installed.

The light distribution pattern for the present invention shown in FIGS. 4 and 5 should be contrasted with that shown in FIG. 3 for a conventional, flat light shelf. Note the traditional flat light shelf is placed closer than normal to the ceiling in FIG. 3 to show performance characteristics for equal amounts of light entering and reflecting off the light shelves. This section normally may have larger daylighting windows increasing the daylight opening of the window to as much as 3-4 feet. Consequently, it should be noted that a traditional light shelf normally projects into the interior as much as 36 inches.

The present light shelf system can be adapted for any of a multitude of uses and environments. As previously discussed, the window glazing 20 is partitioned into a view glass section 21 below the light shelf 30 and a daylighting area 22 located above the light shelf 30. However, it should be noted that the window glazing 20 can be partitioned in any desired configuration by selecting the number, size, location and orientation of the lights shelves 30.

Other possible variations of design include the use of different bottom materials, such as a perforated sheet on the underside 34 of the light shelf 30. Holes and deflectors direct light inside of the light shelf 30 itself casting daylight within the light shelf 30 making it visually more transparent to occupants since the light shelf 30 would be lit by the daylight entering the interior light shelf cavity. The perforated sheet on the underside 34 of the light shelf 30 allows for this light to exit in a diffuse manner so as not to glare into the occupants' field of view.

The embodiment of the light shelf 30 shown in the accompanying drawings employs a hollow, modular construction to reduce weight. The surfaces of light shelf 30 are formed by thin upper and lower panels that are spaced apart from one another and attached at their edges to a nose cap 36 and base plate 37, as shown most clearly in FIG. 1. The lower panel 34 can be designed to be replaceable to match the interior of the building. End pieces and internal ribs can be employed to increase the rigidity and structural properties of the assembly, while keeping weight to a minimum.

The nose cap 36 shown in the embodiment in FIG. 1 can be made as an aluminum extrusion. However many different shapes and methods can be used to obtain a desired architectural appearance, such as wood, plastic, or different shapes such as points, square ends, recessed ends. The nose cap style is purely an architectural element and has little bearing on the light reflective properties of the system.

Although the preferred embodiment of the light shelf 30 is made of reflective metal components, this shape can also be effective with the use of other materials, such as plastics or woods. Different architectural looks and performance characteristics are possible using any of a wide variety of materials in its construction.

A wide variety of mounting mechanisms can be used to mount the light shelf 30 adjacent to the window 20. For example, the detail cross-sectional view provided in FIG. 2 shows screws or bolts extending through the base plate 37 (opposite the nose cap 36) to anchor the light shelf 30 to a mounting bracket 40 secured to the building structure adjacent to the windows. Mounting brackets could also engage the lateral edges of the light shelf 30 (e.g., the light shelf 30 can be secured and supported between two mounting brackets). The mounting brackets can be secured to the windows frames or wall adjacent to the window 20.

It is also possible, where building design permits, for installations of multiple light shelves vertically stacked atop one another (i.e., similar to slats in blinds) on the same window system to gather even more daylight to enhance the luminance. These shelves may be stacked as little as one foot in vertical space to one another to gain additional light if desired.

The curved light shelf daylighting system functions independent of the building's window glazing system and therefore can be used with any commercially-available glazing product in both new construction and in retrofit applications. The optical elements can be fabricated of extruded or stamped metal or plastic materials. The present invention can be totally static and requires no adjustment of tilt throughout the day or during the year to account for variations in the position of the sun in the sky.

To summarize, the cyma-reversa curved light shelf 30 allows light to be efficiently collected and accurately directed onto the ceiling plane, while shading occupants from direct sunlight penetration through the light shelf 30. The window 20 is partitioned into a view glass section 21 and a daylighting area 22 that is very narrow by prior art standards, typically approximately one foot from the ceiling level. The occupants' views out of the building remain relatively unobstructed through the view area 21 to a height of approximately seven feet or greater. Traditional window treatments can be used for this portion 21 of the glazing for shading, privacy, and black-out control. The sunlight 10 incident on the daylighting area 22 is collected and redirected onto the ceiling 24 in a glare-free manner. The cyma-reversa curve is truly unique in that it double washes the reflected light onto the ceiling 24 from both the convex region 31 and the concave region 32 of the upper surface of the light shelf 30.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A light shelf mounted horizontally in an interior room adjacent to a window to reflect sunlight passing through the window upward onto the ceiling of the room, said light shelf comprising:
a reflective upper surface having a cyma-reversa profile along a vertical cross-section perpendicular to the window, with a convex region adjacent to the window and a concave region distal from the window.

2. The light shelf of claim 1 wherein the upper surface is specular.

3. The light shelf of claim 1 wherein the upper surface is light diffusing.

4. The light shelf of claim 1 wherein the convex region disperses reflected sunlight over a large area of the ceiling.

5. The light shelf of claim 4 wherein the concave region reflects sunlight in an area of the ceiling that at least partially overlaps the area of sunlight reflected by the convex region.

6. The light shelf of claim 1 further comprising mounting means for attaching and supporting the light shelf adjacent to the window.

7. The light shelf of claim 1 wherein the convex region curves downward adjacent to the window.

8. A light shelf mounted horizontally in an interior room adjacent to a window to reflect sunlight passing through the window upward onto the ceiling of the room, said light shelf comprising:
a thin upper panel with a reflective surface having a cyma-reversa profile along a vertical cross-section perpendicular to the window, with a convex region adjacent to the window and a concave region distal from the window, said upper panel also having a window edge adjacent to the window and a distal edge opposing the window edge;
a thin lower panel spaced apart from the upper panel having a window edge adjacent to the window and a distal edge opposing the window edge; and
a nose cap engaging the distal edges of the upper and lower panels; and
a base plate engaging the windows edges of the upper and lower panels, said base plate.

9. The light shelf system of claim 8 wherein the base plate further comprises means for securing the light shelf adjacent to a window.

10. The light shelf system of claim 8 wherein the convex region disperses reflected sunlight over a large area of the ceiling.

11. The light shelf system of claim 8 wherein the concave region reflects sunlight in an area of the ceiling that at least partially overlaps the area of sunlight reflected by the convex region.

12. The light shelf system of claim 8 wherein the convex region curves downward adjacent to the window.

13. The light shelf system of claim 8 wherein the lower panel is perforated.

14. A light shelf mounted horizontally in an interior room adjacent to a window to reflect sunlight passing through the window upward onto the ceiling of the room, said light shelf comprising:
a reflective upper surface having a cyma-reversa profile along a vertical cross-section perpendicular to the window with a convex region adjacent to the window curving downward to disperse reflected sunlight over a large area of the ceiling, and a concave region continuing from the convex region distal from the window to reflect sunlight in an area of the ceiling that at least partially overlaps the area of sunlight reflected by the convex region.

15. The light shelf system of claim 14 further comprising mounting means for attaching and supporting the light shelf adjacent to the window.

16. The light shelf system of claim 14 wherein the upper surface is specular.

17. The light shelf system of claim 14 wherein the upper surface is light diffusing.

* * * * *